United States Patent [19]

Allen et al.

[11] 4,204,889

[45] May 27, 1980

[54] SOFT SOLDERING OF ALUMINIUM

[75] Inventors: Bernard M. Allen; Wallace Rubin; Brian Watson, all of Hemel Hempstead, England

[73] Assignee: Multicore Solders Limited, Hemel Hempstead, England

[21] Appl. No.: 941,768

[22] Filed: Sep. 13, 1978

[30] Foreign Application Priority Data

Oct. 18, 1977 [GB] United Kingdom ............... 43375/77

[51] Int. Cl.$^2$ ............................................. B23K 35/34
[52] U.S. Cl. ..................................................... 148/26
[58] Field of Search ......................................... 148/26

[56] References Cited

U.S. PATENT DOCUMENTS

| | | | |
|---|---|---|---|
| 2,403,109 | 3/1943 | Miller | 148/26 |
| 2,596,466 | 5/1952 | Bowden | 148/26 |
| 2,817,894 | 12/1957 | Steinberg | 148/26 |
| 2,817,895 | 12/1957 | Chile | 148/26 |
| 3,988,175 | 10/1976 | Baker | 148/26 |

*Primary Examiner*—P. D. Rosenberg
*Attorney, Agent, or Firm*—Finnegan, Henderson, Farabow, Garrett & Dunner

[57] ABSTRACT

The soft soldering of an aluminium or aluminium-based alloy member to another member of a metal or alloy capable of being soft soldered to aluminium at a joint site is effected using a lead/tin soft solder alloy in conjunction with a flux containing as one of the essential constituents a silver halide so that sufficient silver is deposited with the soft solder alloy at the joint site to prevent corrosion of the joint.

10 Claims, No Drawings

SOFT SOLDERING OF ALUMINIUM

This invention relates to soft soldering and is concerned with a solder flux for use in soft soldering aluminium or aluminium alloys, with fluxed solder compositions containing such a flux, and with a method of soft soldering aluminium or aluminium alloys using such a flux.

It has recently been found that the incorporation of a small proportion of silver in a lead/tin soft solder alloy makes it possible, by the use of such an alloy in conjunction with a flux of a type commonly known to be suitable for use in the soft soldering of aluminium, to form a soldered joint between an aluminium (or aluminium-based alloy) member and a member formed from a metal (or alloy) capable of being soft soldered to aluminium, which joint has substantially improved resistance to corrosion compared with a joint formed from a similar alloy containing no silver, provided that the silver is present in the lead/tin/silver alloy in a critical weight ratio with respect to the tin. In this connection we refer to our British Patent Specification No. 1,478,644.

We have now surprisingly found that such soldered aluminium joints having improved corrosion resistance can be obtained by using, in conjunction with a conventional lead/tin soft solder alloy, a critically formulated flux having incorporated therein a small proportion of silver in the form of a silver halide, so that during the soldering operation sufficient silver derived from the silver halide, together with the soft solder alloy, is deposited at the joint interface to prevent corrosion leading to failure of the joint. The presence of the silver halide in the flux provides a considerable technical and economic advantage compared with the use of a lead/tin/silver soft solder alloy, in that the amount of silver required and utilized is greatly reduced, so reducing the overall cost of the soldering operation and making it possible to obtain the advantage of improved corrosion resistance at only slightly more cost than a conventional soldering operation with tin/lead alloy and conventional solder flux.

Thus, in accordance with one aspect of the present invention, there is provided a flux for use in soft soldering an aluminium or aluminium-based alloy member to a member formed from a metal or alloy capable of being soft soldered to aluminium at a joint site, the flux comprising (1) a heavy metal chloride selected from zinc chloride, stannous chloride and mixtures thereof, (2) an ammonium or alkali metal halide, for example ammonium chloride, ammonium bromide, lithium chloride, lithium bromide, sodium chloride, sodium bromide, or potassium chloride, (3) an ammonium or alkali metal fluorine-containing compound, for example ammonium fluoride, ammonium bifluoride, lithium fluoride, sodium fluoride, potassium fluoride, or potassium bifluoride, and (4) a silver halide selected from silver chloride, silver bromide and silver iodide.

In accordance with another aspect of the invention there is provided a method of soft soldering a first member of aluminium or aluminium-based alloy to a second member of a metal or alloy capable of being soft soldered to aluminium at a joint site, which method comprises disposing the said first and second members in a position in which they are to be soldered together at a joint site, providing at the said joint site a lead/tin soft solder alloy and a flux in accordance with the invention, and thereafter soldering together at the said joint site said first and second members.

The second member may be formed from aluminium or an aluminium-based alloy, or from a different metal or alloy, for example brass, copper, nickel, tin-plate or steel.

The flux may contain, for example, from 60 to 90 weight percent of the heavy metal chloride(s), from 2 to 25 weight percent of the ammonium or alkali metal halide, from 1 to 20 weight percent of the ammonium or alkali metal fluorine-containing compound, and from 0.5 to 20 weight percent of the silver halide, preferably silver chloride, all percentages being based on the total flux.

Advantageously the flux contains a mixture of the heavy chlorides, since in this manner it is possible to reduce the melting point of the flux to a temperature suitable for a particular soldering process. The zinc chloride and stannous chloride can be mixed in any proportions depending on the melting point required for the flux.

The flux may conveniently be prepared in liquid form by diluting it, or suspending it, in a suitable solvent (which may in some cases be water or an alcohol) in appropriate concentrations. Alternatively the flux may be introduced to the joint site in solid form. Advantageously the flux is incorporated in the soft solder alloy to provide a fluxed solder composition.

The fluxed solder composition may be in the form of a paste or cream comprising an intimate mixture of the flux and the powdered soft solder alloy or in the form of a length of the soft solder alloy coated with the solid flux. However, in a particularly convenient form, the fluxed solder composition is provided as a length of the soft solder alloy in the form of a stick, wire or ribbon in which the flux is included as one or a plurality of substantially continuous strands of flux extending longitudinally through the interior of the length of soft solder alloy. This latter form of fluxed solder composition is generally known as a flux cored solder. These flux cored solders are generally formed by extruding the solder alloy to form a stick, wire or ribbon and simultaneously therewith introducing the flux into one or more cavities formed in the extruded section. Usually the cross-sectional dimensions of the stick, wire or ribbon are thereafter reduced by, for example, drawing or rolling. Flux cored solders formed as a wire or ribbon are generally stored in coiled form, with or without a former. Apart from the forms of fluxed solder compositions mentioned above, another form which has been found useful is a shape or "preform" which has been selected so as to be suitable for a particular soldering process. The shape is abstracted, for example by stamping or cutting, from a larger quantity of fluxed solder composition.

The flux according to the present invention can be used with tin/lead soft solder alloys containing at least 10% by weight of tin with the balance being lead. For example, the alloy may be a 15/85 or 30/70 tin/lead alloy. If desired, the alloy may contain minor proportions of one or more other metals, for example antimony, copper or cadmium.

The following Examples illustrate the invention.

EXAMPLE 1

A solid flux was prepared by mixing together the following constituents:

| | % by weight |
|---|---|
| Zinc chloride | 48.6 |
| Stannous chloride | 32.4 |
| Potassium chloride | 15.0 |
| Potassium fluoride | 2.0 |
| Silver chloride | 2.0 |

This flux, which had a melting point of about 160° C., was used to form joints between aluminium alloy members by soft soldering with a 15/85 tin/lead alloy. Such joints have been found to resist corrosive attack after immersion in brine solution for at least four weeks.

EXAMPLE 2

A solid flux was prepared by mixing together the following constituents:

| | % by weight |
|---|---|
| Zinc chloride | 47.4 |
| Stannous chloride | 31.6 |
| Ammonium chloride | 15.0 |
| Potassium fluoride | 4.0 |

This flux, which had a melting point of about 160° C., was used to form joints between aluminium alloy members by soft soldering with a 30/70 tin/lead alloy. These joints were found to resist corrosive attack when immersed in brine solution.

EXAMPLE 3

A solid flux was prepared by mixing together the following constituents:

| | % by weight |
|---|---|
| Zinc chloride | 64.2 |
| Ammonium bromide | 23.8 |
| Potassium bifluoride | 10.0 |
| Silver bromide | 2.0 |

This flux had a melting point of about 190° C.

EXAMPLE 4

A solid flux was prepared by mixing together the following constituents:

| | % by weight |
|---|---|
| Stannous chloride | 85.0 |
| Potassium chloride | 4.0 |
| Potassium bifluoride | 10.0 |
| Silver iodide | 1.0 |

This flux had a melting point of between 190° and 200° C.

EXAMPLE 5

A solid flux was prepared by mixing together the following constituents:

| | % by weight |
|---|---|
| Stannous chloride | 85.0 |
| Potassium chloride | 4.0 |
| Ammonium bifluoride | 10.0 |
| Silver iodide | 1.0 |

This flux had a melting point of between 190° and 200° C.

What is claimed is:

1. A flux for use in soft soldering an aluminium or aluminium-based alloy member to a member formed from a metal or alloy capable of being soft soldered to aluminium at a joint site, the flux consisting essentially of a mixture, based on the total weight of the flux, of (1) from 60 to 90 percent of a heavy metal chloride selected from zinc chloride, stannous chloride and mixtures thereof, (2) from 2 to 25 percent of an ammonium or alkali metal halide, (3) from 1 to 20 percent of an ammonium or alkali metal fluorine-containing compound, and (4) from 0.5 to 20 percent of a silver halide selected from silver chloride, silver bromide and silver iodide.

2. A flux as claimed in claim 1, wherein there is present in the flux a mixture of zinc chloride and stannous chloride.

3. A flux as claimed in claim 1, wherein the ammonium or alkali metal halide is selected from ammonium chloride, ammonium bromide, lithium chloride, lithium bromide, sodium chloride, sodium bromide, or potassium chloride.

4. A flux as claimed in claim 1, wherein the ammonium or alkali metal fluorine-containing compound is selected from ammonium fluoride, ammonium bifluoride, lithium fluoride, sodium fluoride, potassium fluoride, or potassium bifluoride.

5. A flux as claimed in claim 1, wherein the silver halide is silver chloride.

6. A fluxed solder composition comprising a lead/tin soft solder alloy and a flux in association therewith consisting essentially of a mixture, based on the total weight of the flux, of (1) from 60 to 90 percent of a heavy metal chloride selected from zinc chloride, stannous chloride and mixtures thereof, (2) from 2 to 25 percent of an ammonium or alkali metal halide, (3) from 1 to 20 percent of an ammonium or alkali metal fluorine-containing compound, and (4) from 0.5 to 20 percent of a silver halide selected from silver chloride, silver bromide and silver iodide.

7. A method of soft soldering a first member of aluminium or aluminium-based alloy to a second member of a metal or alloy capable of being soft soldered to aluminium at a joint site, comprising disposing the said first and second members in a position in which they are to be soldered together at the joint site, providing at said joint site a lead/tin soft solder alloy and a flux consisting essentially of a mixture, based on the total weight of the flux, (1) from 60 to 90 percent of a heavy metal chloride selected from zinc chloride, stannous chloride and mixtures thereof, (2) from 2 to 25 percent of an ammonium or alkali metal halide, (3) from 1 to 20 percent of an ammonium or alkali metal fluorine-containing compound, and (4) from 0.5 to 20 percent of a silver halide selected from silver chloride, silver bromide and silver iodide.

8. A method according to claim 7, wherein the lead/tin soft solder alloy and the flux are provided simultaneously at the joint site in the form of a fluxed solder composition comprising said solder alloy and said flux.

9. A method according to claim 8, wherein said fluxed solder composition is in the form of a flux cored solder.

10. A method according to claim 7, wherein said lead/tin alloy contains at least 10% by weight of tin.

* * * * *

UNITED STATES PATENT AND TRADEMARK OFFICE
CERTIFICATE OF CORRECTION

PATENT NO. : 4,204,889
DATED : May 27, 1980
INVENTOR(S) : Bernard M. Allen et al.

It is certified that error appears in the above-identified patent and that said Letters Patent are hereby corrected as shown below:

Column 3, after line 9 of Example 2, insert
--Silver chloride         2.0--.

Signed and Sealed this

Tenth Day of March 1981

[SEAL]

*Attest:*

RENE D. TEGTMEYER

*Attesting Officer*    *Acting Commissioner of Patents and Trademarks*